(12) United States Patent
T

(10) Patent No.: US 7,599,291 B2
(45) Date of Patent: Oct. 6, 2009

(54) DATA-RATE DETECTION IN CDMA SYSTEMS

(75) Inventor: Kiran T, Bangalore (IN)

(73) Assignee: Sasken Communication Technologies Limited, Bangalore (IN)

(*) Notice: Subject to any disclaimer, the term of this patent is extended or adjusted under 35 U.S.C. 154(b) by 776 days.

(21) Appl. No.: 10/486,119

(22) PCT Filed: Aug. 8, 2001

(86) PCT No.: PCT/IB01/01419

§ 371 (c)(1),
(2), (4) Date: Jul. 22, 2004

(87) PCT Pub. No.: WO02/056556

PCT Pub. Date: Jul. 18, 2002

(65) Prior Publication Data

US 2005/0018614 A1    Jan. 27, 2005

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/232; 370/342
(58) Field of Classification Search ............. 370/232, 370/252, 320, 342; 714/790
See application file for complete search history.

(56) References Cited

U.S. PATENT DOCUMENTS 5,566,206 A    10/1996 Butler et al.
5,864,548 A *  1/1999 Liu .................... 370/320
6,341,125 B1 * 1/2002 Hong et al. ........... 370/335
6,510,137 B1 * 1/2003 Belaiche ............... 370/232
6,747,963 B1 * 6/2004 Park et al. ............. 370/335
6,882,636 B1 * 4/2005 Kim et al. ............. 370/342
7,076,726 B1 * 7/2006 Yun et al. .............. 714/790
7,159,155 B2 * 1/2007 Obuchi et al. ......... 714/704

FOREIGN PATENT DOCUMENTS

GB    2349042    10/2000

OTHER PUBLICATIONS

"Technical Specification Group Radio Access Network Multiplexing and Channel Coding (FDD) (3G TS 25.212 version 3.0.0)", 3rd Generation Partnership Project (3GPP),(Oct. 1999), 1-54.

* cited by examiner

*Primary Examiner*—Kevin C Harper
*Assistant Examiner*—Leon Andrews
(74) *Attorney, Agent, or Firm*—Schwegman, Lundberg & Woessner P.A.

(57) ABSTRACT

The present invention provides an improved receiver for data-rate detection in a signal received from a transmitter of a cellular radio communication system including multiple transport channels supporting variable data-rate transmissions. This is accomplished by a computationally efficient technique for data-rate detection. The improved receiver receives data and TFCI associated with each of the multiple transport channels. The receiver then obtains a maximum number of valid transport format combinations and a maximum number of TFCIs that can be formed. The receiver then computes a subset of TFCIs using the obtained maximum number of valid transport format combinations and the maximum number of TFCIs, and decodes from the computed subset of TFCIs within the frame to reduce computation during decoding and to improve data-rate detection reliability.

66 Claims, 8 Drawing Sheets

DATA-RATE DETECTION IN CDMA SYSTEMS

FIELD OF THE INVENTION

This invention generally relates to variable data-rate transmissions in Third Generation (3G) systems, and more particularly to techniques for detecting variable data-rate transmission in Code Division Multiple Access (CDMA) based 3G systems that support variable data-rate transmission.

BACKGROUND

As radio communication becomes more widely accepted, it will be desirable to provide various types of radio communication services to meet consumer demand. For example, support for facsimile, e-mail, video, Internet access, etc., via radio communication systems are envisioned. Moreover it is expected that users may wish to access different types of services at the same time. For example, a videoconference between two users would involve both speech and video support. Some of these different services will require relatively high data-rates compared with speech service that has been conventionally supplied by radio communication systems, while other services will require variable data-rate service. Thus, it is anticipated that future radio communication systems will need to be able to support high data-rate communications as well as variable data-rate communications. Currently 3G wireless systems support such a variety of applications that need different Quality of Services (QoS). The Direct Sequence Code Division Multiple Access (DS-CDMA) based 3G system has greater flexibility in offering variable data-rates, which are particularly important for multimedia and Internet services.

The DS-CDMA system applies pilot-symbol-assisted coherent detection to achieve coherent reverse and forward links. Known pilot symbols are multiplexed with a coded data symbol sequence to make it possible at the receiver to estimate the time varying radio channel gains associated with each resolved multipath component, and then to combine the resolved multi-path components coherently in the Rake receiver.

During communication, the transmitting data-rate may vary every frame. For example, variable-rate voice codec (codec is a generally abbreviated word for COder-DECoder) is used to reduce the average bit rate. The radio link capacity of cellular DS-CDMA mobile radio is limited mainly by the multiple access interference (MAI) from other users transmitting at the same carrier frequency in the same and other cells. The use of discontinuous transmission to match the varying data-rate can reduce the interference to other users. Furthermore, discontinuous transmission is an effective means for prolonging the battery life of mobile terminals. To recover variable-rate data, reliable detection of the data-rate is necessary at the receiver end.

Regardless of the particular technique adopted in a radio communication system for providing variable rate transmission capability, the receiver must know the particular data-rate at which a signal is transmitted in order to properly detect and decode the received signal. Current methods for informing the receiver of the instantaneous data-rate of received signal generally fall into following two categories.

Some systems that explicitly transmit bit rate information (also referred to as Transport Formal Combination Information (TFCI)) along with the data (transmitted signal). Normally, Forward Error Correction (FEC) coding is used on TFCI before transmission. Also, the TFCI is transmitted at a much higher power compared to the user data. On the receiver, a suitable decoder is used so that the TFCI is decoded with sufficient reliability. The TFCI is used in order to inform the receiving side of the currently valid Transport Format Combination, and hence how to decode, de-multiplex and deliver the received data on the appropriate Transport Channels.

Other systems provide the receiver with the capability to "blindly" determine the rate at which data has been transmitted. Such systems do not transmit any TFCI information along with the data. The receiver operates, for example, by decoding for different possible rates and checking for correct Cyclic Redundancy Check (CRC). U.S. Pat. No. 5,566,206 to Butler et al. provides an example of blind rate detection. Generally, blind rate detection schemes are used only when there are fewer possible rates (when there are fewer TFCIs).

Both of the above current techniques have drawbacks. For example, blind rate detection results in relatively complex receivers due to the additional circuitry/logic needed to correctly identify one of a plurality of possible data transmission rates. Also, the blind rate detection scheme assumes that the data-rate changes every frame, which might not be the case, and this can result in increased False Detection Rate (Detection of wrong data-rate), slowing the process of data-rate detection and generally requiring more computation.

The transmission of explicit TFCI also creates design issues. For example, the TFCI is transmitted in the same data frame as the data and they not only include data-rate information but also include spreading factor (SF) information, which is required for decoding data symbols. Therefore, SF is needed for proper decoding of data symbols and the TFCI has to be decoded as fast as possible to avoid storing of the received data. That is, as soon as the data for a frame is available in the transmitter, the TFCI for that frame has to be computed, decoded, and transmitted. Any delay in decoding the TFCI can be undesirable for low-delay services like speech, especially for large frame lengths. When the TFCI is transmitted in the same frame as the data, and if there is any undesirable delay in the decoding, the receiver has to buffer the received signal until it has detected and decoded the TFCI for that frame. Buffering the data in the receiver requires additional cost and complexity. Also, explicit TFCI is transmitted every 10 milliseconds (every frame) and is similarly decoded once every frame on the receiver side. During bad channel conditions, this method of coding and decoding (where it is assumed that data-rate changes every frame) yields poor results as every 10 milliseconds one of many possible explicit TFCIs has to be detected by searching for the maximum output across all encoded bits. Generally, this method requires more computation and can result in slower data-rate detection.

Therefore, there is a need in the art for efficient and reliable data-rate detection to detect at what variable rate a signal is transmitted, in order to properly detect and decode the received signal.

SUMMARY OF THE INVENTION

A receiver detects a data-rate in a signal transmitted by a cellular radio communication system including multiple transport channels supporting variable data-rate transmissions. In one example embodiment, this is accomplished by receiving the signal including a succession of frames. Each of the received succession of frames includes data and the Transport Formal Combination Information (TFCI) associated with each of the multiple transport channels. The receiver then obtains a maximum number of valid transport format combinations that can be formed for the multiple transport channels from a given size of Transport Format Combination Set TFCS) table within each frame. The receiver then obtains a maximum number of TFCIs that can be formed using the TFCS with the frame. The receiver further computes a subset of the TFCIs using the obtained maximum number of valid transport format combinations and the obtained maximum number of TFCIs within the frame. The receiver then decodes the received TFCI using the computed subset of TFCIs to reduce computation during decoding and to improve the data-rate detection reliability.

Another aspect of the present invention is a method for data-rate detection in a signal received from a transmitter of a radio communication system including multiple transport channels supporting variable data-rate transmissions. The method is performed by receiving the signal including a succession of frames, wherein the signal in each of the succession of frames includes data and the TFCI associated with each of the multiple transport channels. Using the received data and TFCI a maximum number of valid transport format combinations that can be formed for the multiple transport channels from a given size of TFCS table within each frame is obtained. The obtained TFCS within each frame is used to further obtain a maximum number of TFCIs. The obtained maximum number of TFCIs is used to compute a subset of TFCIs. Then the computed subset of TFCIs are decoded to reduce computation during decoding and to improve data-rate detection reliability.

Another aspect of the present invention is a computer readable medium having computer-executable instructions for an improved data-rate detection in a communication system including multiple transport channels supporting variable data-rate transmissions. According to the method, a signal including a succession of frames is received, wherein the signal in each of the succession of frames includes data and the TFCI associated with each of the multiple transport channels. Using the received data and the TFCI a maximum number of valid transport formal combinations that can be formed for the multiple transport channels from a given size of TFCS table within each frame is obtained. The obtained TFCS within each frame is used to further obtain a maximum number of TFCIs. The obtained maximum number of TFCIs is used to compute a subset of TFCIs. Then the computed subset of TFCIs are decoded to reduce computation during decoding and to improve data-rate detection reliability.

Another aspect of the present invention is a computer system for detecting data-rate detection signal received from a transmitter capable of transmitting data at a plurality of data rates. The computer system comprises a storage device, an output device, and a processor programmed to repeatedly perform a method. According to the method, a signal including a succession of frames is received, wherein the signal in each of the succession of frames includes data and the TFCI associated with each of the multiple transport channels. Using the received data and the TFCI a maximum number of valid transport formal combinations that can be formed for the multiple transport channels from a given size of TFCS table within each frame is obtained. The obtained TFCS within each frame is used to further obtain a maximum number of TFCIs. The obtained maximum number of TFCIs is used to compute a subset of TFCIs. Then the computed subset of TFCIs are decoded to reduce computation during decoding and to improve data-rate detection reliability.

Other aspects of the invention will be apparent on reading the following detailed description of the invention and viewing the drawings that form a part thereof.

DETAILED DESCRIPTION

The present invention provides an improved receiver by increasing the efficiency and reliability of data-rate detection in a radio communication system including multiple transport channels supporting variable data-rate transmissions. This is accomplished by providing computationally efficient and more accurate detection techniques.

Figure 1:
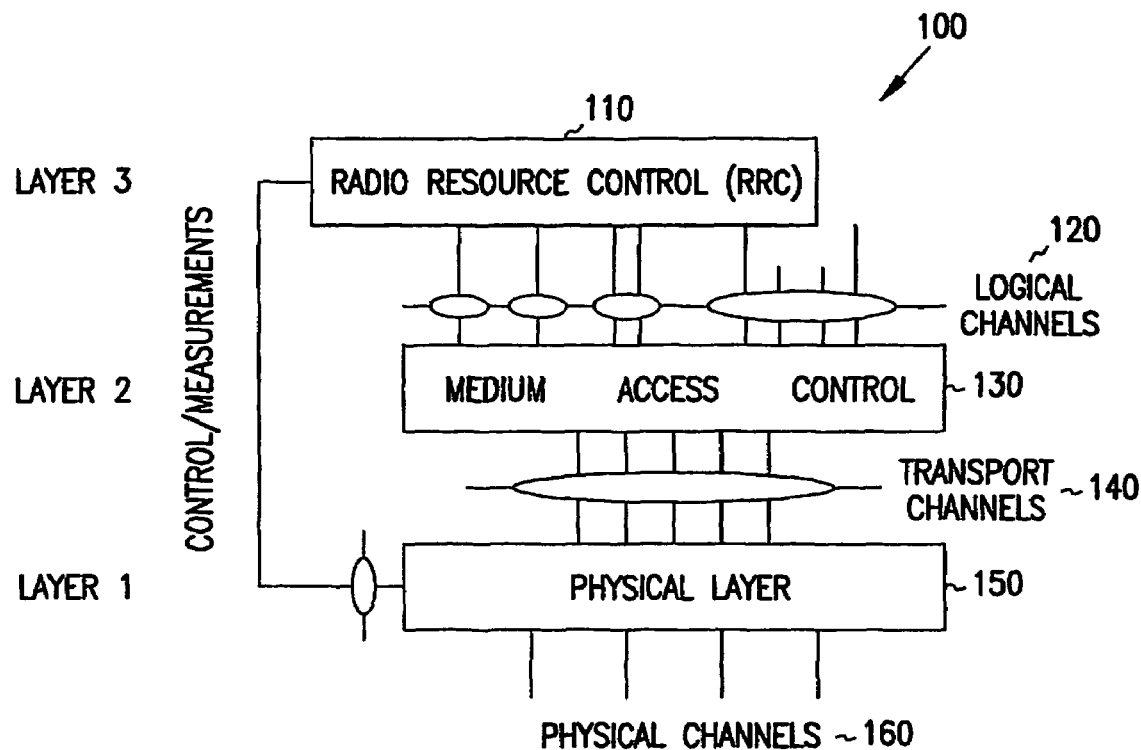
FIG. 1 is a block diagram of a prior-art Third Generation Partnership Project (3GPP) radio interface protocol architecture.

FIG. 1 shows a prior-art 3GPP radio interface protocol architecture 100 including major components and their interconnections. Generally FIG. 1 shows how physical layer 150 is interconnected to Medium Access Control (MAC) 130 and Radio Resource Control (RRC) 110. Also shown in FIG. 1 are logical channels 120, transport channels 140, and physical channels 160 and their interconnections to the physical layer 150, MAC 130, and RRC 110. The basic protocol architecture 100 shown in FIG. 1 is the same for both the mobile side and the network side. The RRC 110, MAC 130, and the Physical layer 150 are also referred to as Layer 1 (L1), Layer (L2), and Layer 3 (L3), respectively. RRC 110 controls the behavior of the physical layer 150 by defining the operation of the logical and transport channels. During operation RRC 110 talks to MAC 130 through the logical channels 120, and the MAC 130 talks to physical layer 150 through the transport channels 140. The basic unit exchanged between MAC 130 and the Physical Layer 150 is a 'Transport Block' (TB). When more than one transport block is exchanged between MAC 130 and physical layer 150 at the same time using the transport channels 140, then it is called the 'Transport Block Set' (TBS). Transport Block Size is defined as the number of bits in a TB. Transport Block Size is always fixed within a given TBS, that is all TBs within a TBS are equally sized.

Generally, transport channels 140 such as broadcast channels are configured based on type of services such as telephone calls, or browsing Internet, etc., that the protocol architecture 100 is accessing. During operation, if a phone call is made RRC 110 will configure a dedicated channel and MAC 130 will talk to physical layer 150 through this dedicated channel.

Each of the transport channels 140 will have a Transport Format (TF). This is generally the format offered by Physical Layer 150 to the MAC 130 (and vice versa) for the delivery of a TBS during a Transmission Time Interval (TTI) on a Transport Channel. TF is basically a structure for each of the transport channels 140 offered by the RRC 110. TF is like a packet containing information on what type of operation can be performed on which channel. Before a transport channel is configured, the TF information will be sent by the RRC 110 to the physical layer 150. Therefore, the physical layer 150 will know ahead of time what operation can be performed for which channel. TF is specific to one transport channel.

TTI is defined as the inter-arrival time of TBSs, and is equal to the periodicity at which a TBS is transferred by the physical layer 150 on the radio interface. It is always a multiple of the minimum interleaving period (for example 10, 20, 40, and 80 milliseconds as the length of one Radio Frame). MAC 130 delivers one TBS to the physical layer 150 every TTI. The TF contains two parts, one being the dynamic part and the other being the semi-static part. RRC 110 configures each of the transport channels to receive data from MAC 130 at a TTI of 10, 20, 30, or 40 milliseconds. Each transport channel can have its own TTI. Physical channel 150 can receive data from each of the transport channels 140 every 10 milliseconds (one frame).

Attributes of the Dynamic Part are:

Transport Block Size

Transport Block Set Size (TBSS). TBSS is defined as the number of bits in a TBS.

Attributes of the Semi-Static Part are:

TTI (10, 20, 40, or 80 milliseconds)

Error protection scheme to apply

Type of error protection (turbo code, convolution code or no channel coding)

Coding rate (½ or ⅓)

Static rate matching parameter

Puncturing limit (FDD: for uplink only)

Size of Cycle Redundancy Check (CRC) (0, 8, 12, 16, or 24 bits).

For example the dynamic part can include [320 bits, 640 bits] which are TBSize and TBSS, respectively. The semi-static part can include [10 milliseconds, convolutional coding only, static rate matching parameter=1, 16 bits] which are TTI, Type of Error protection, and bit size of CRC, respectively.

Physical layer 150 multiplexes one or several transport channels 140, and for each transport channel, there exists a list of transport formats (a Transport Format Set) which are applicable. Nevertheless, at a given point of time, not all combinations may be submitted to physical layer 150 but only a subset, which is referred to as Transport Format Combinations (TFC). This is defined as an authorized combination of the currently valid TFs that can be submitted simultaneously to the physical layer 150 for transmission on a Coded Composite Transport Channel.

For Example:

|  | Dynamic part | Semi-static part |
| --- | --- | --- |
| DCH1: | [20 bits, 20 bits] | [10 ms, Convolution coding, Static rate matching parameter = 3] |
| DCH2: | [320 bits, 1280 bits] | [10 ms, Convolution coding, Static rate matching parameter = 3] |
| DCH3: | [320 bits, 320 bits] | [40 ms. Turbo coding, static rate matching parameter = 2] |

Transport Format Combination Set (TFCS) is defined as a set of TFCs on a Coded Composite Transport Channel.

For Example:

Dynamic Part:

Combination 1: DCH1: [20 bits, 20 bits], DCH2: [320 bits, 1280 bits], DCH3: [320 bits, 320 bits]

Combination 2: DCH1: [40 bits, 40 bits], DCH2: [320 bits, 1280 bits], DCH3: [320 bits, 320 bits]

Combination 3: DCH1 [160 bits, 160 bits], DCH2: [320 bits, 320 bits], DCH3: [320 bits, 320 bits]

Semi-Static Part:

DCH 1: [10 ms, convolutional coding only, static rate matching parameter=1]

DCH 2: [10 ms, convolutional coding only, static rate matching parameter=1]

DCH 3: [40 ms, Turbo coding, static rate matching parameter=2]

Note that the TFCS need not contain all possible TFCs that can be formed by TFSs of the corresponding TCs. It is only the allowed combinations by the RRC 110 are included. Thereby a maximum total bit rate of all transport channels of a Code Composite Transport channel can be set appropriately. Transport Format Indicator (TFI) is an index for a specific transport format within a TFS. It is used in the inter-layer communication between the MAC 130 and L1 150 each time a transport block set is exchanged between the two layers on a transport channel. Transport Format Combination Indicator (TFCI) is a representation of the current TFC. There is a one-to-one correspondence between a certain value of the TFCI and a certain TFC. The TFCI is used in order to inform the receiving side of the currently valid TFC, and hence how to decode, de-multiplex, and deliver the received data on the appropriate transport channels 140.

Figure 2:
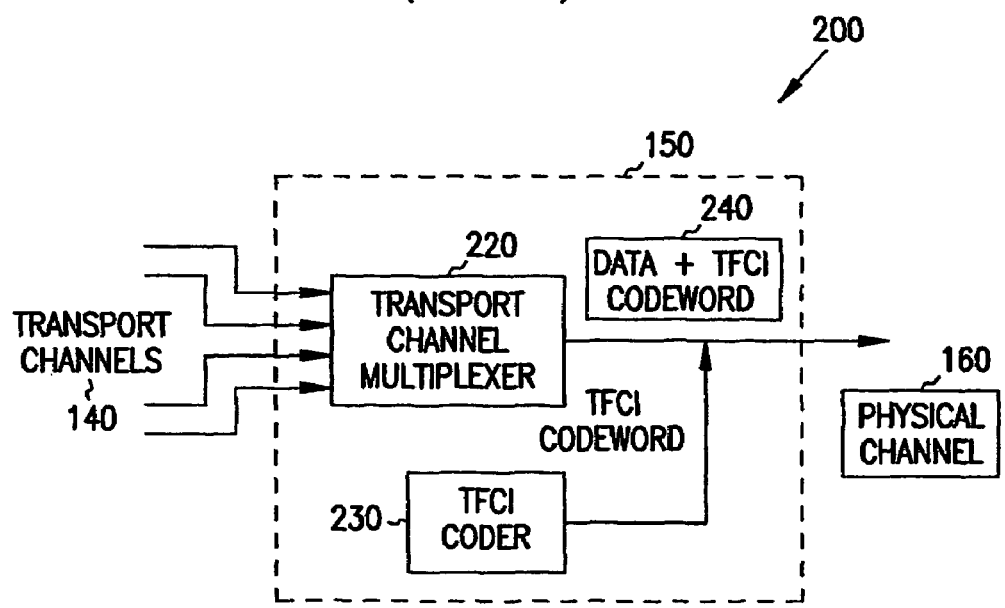
FIG. 2 is a block diagram including major components of the prior art 3GPP physical layer transmitter shown in FIG. 1.

FIG. 2 is a block diagram 200 showing major components of the prior art 3GPP physical layer transmitter 100 shown in FIG. 1. Shown in FIG. 2 are transport channels 140, transport channel multiplexer 220, TFCI coder 230, and physical channel(s) 160.

In operation, the transport channels 140 receive data from MAC 130 and the received data gets formatted based on instructions from RRC 110 and gets multiplexed by a multiplexer 220 in the physical layer and outputs the data through physical channel 160. In some embodiments, the physical layer transmitter 200 can have more than one physical channel 240. MAC 130 indicates the TFI to Physical layer 150 at each delivery of Transport Block Sets on each transport channel. Physical layer 150 then builds from the TFC using the TFCI Coder 230 and the TFIs of all parallel transport, processes the Transport Blocks appropriately and appends the encoded TFCI (TFCI Codeword) to the physical control signaling channel. The multiplexed data along with the TFCI Codeword is outputted 240 from the physical layer transmitter 200.

Through the detection of the TFCI Codeword the receiving side is able to identify the TFC. The multiplexing and the exact rate matching patterns follow predefined rules and may therefore be derived (given the Transport Format Combinations) by transmitter and receiver without signaling over the radio interface. Hence the TFCI is very important data (information) on which the decoding of all transport channels depends. Wrong TFCI detection will introduce errors in all transport channels. Hence, any improvement in the TFCI detection reliability greatly improves the performance.

Figure 3:
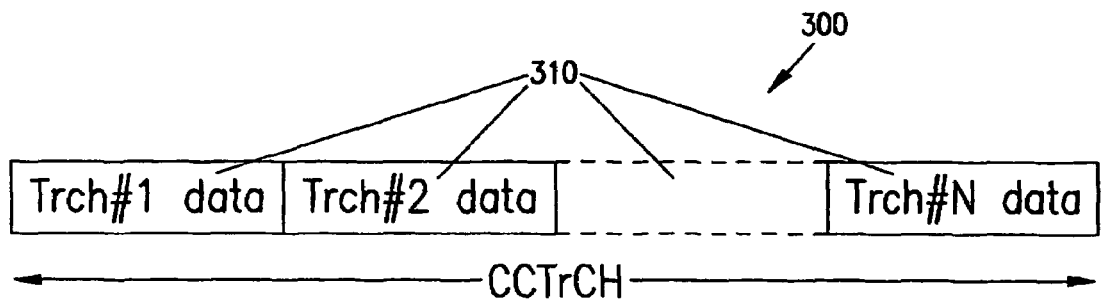
FIG. 3 is a prior art illustration of the Coded Composite Transport Channel (CCTrCH) signal obtained by multiplexing the output of rate matching block of different transport channels shown in FIG. 1.

FIG. 3 illustrates the Coded Composite Transport Channel (CCTrCH) signal 300 obtained by multiplexing the output of rate matching block of different transport channels 140 shown in FIG. 1. Shown in FIG. 3 are the multiplexed signal 310 using the data received from different transport channels. The multiplexed signal 310 includes the outputs from transport channels 1, 2, N, respectively. The data in the multiplexed signal 310 is sequential (so that it is easier store the data in the memory), that is, the first block is from first transport channel, the second block is from second transport channel and so on. In situations where there is more than one physical channel as shown in FIG. 1, the multiplexed signal 310 is divided equally amongst the physical channels 160. It can be seen that the multiplexed signal 310 includes data that is sequential in nature and without the TFCI information the receiver side will not know how much of the multiplexed data has to go into each of the transport channels.

Figure 4:
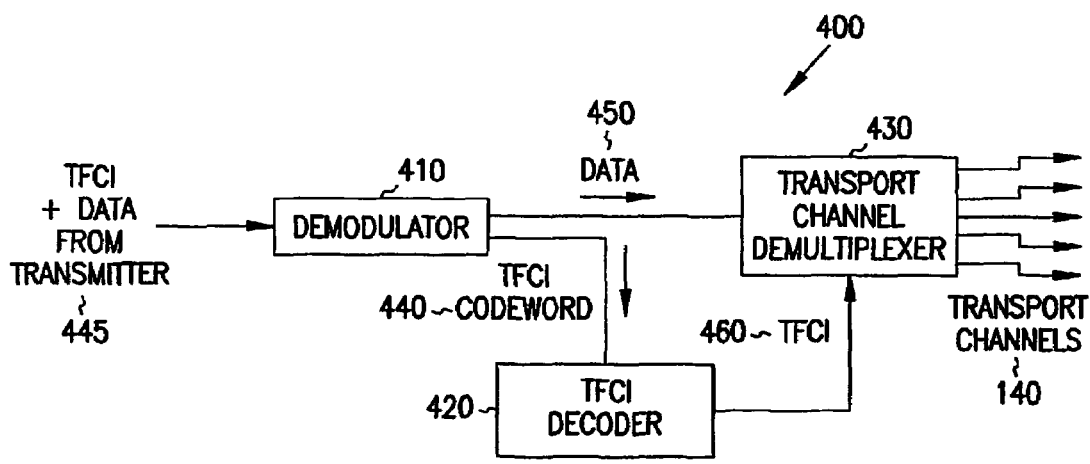
FIG. 4 is a block diagram of the prior art 3GPP physical layer receiver shown in FIG. 1.

FIG. 4 is a block diagram 400 of the prior art 3GPP physical layer receiver 400 shown in FIG. 1. Shown in FIG. 4 are demodulator 410, TFCI decoder 420, transport channel de-multiplexer 430, and transport channels 140.

In operation, the demodulator 410 receives data along with the control information TFCI (TFCI Codeword) 440 from the physical channels 240. The received data 450 along the TFCI Codeword 440 is demodulated by the demodulator 410, data 450 is separated from the TFCI Codeword 440. The separated TFCI Codeword 440 is then inputted to the TFCI decoder 420 and the decoded TFCI 460 is inputted apriori to the transport channel de-multiplexer, and then the data is inputted to the transport channel de-multiplexer 430, where the transport channel de-multiplexer 430 using the received TFCI 460 splits the received data and routes the data to the appropriate transport channels 140. These operations are performed every 10 milliseconds by the receiver 400, because the physical channels 160 transmit the data along with the TFCI every 10 milliseconds.

Figure 5:
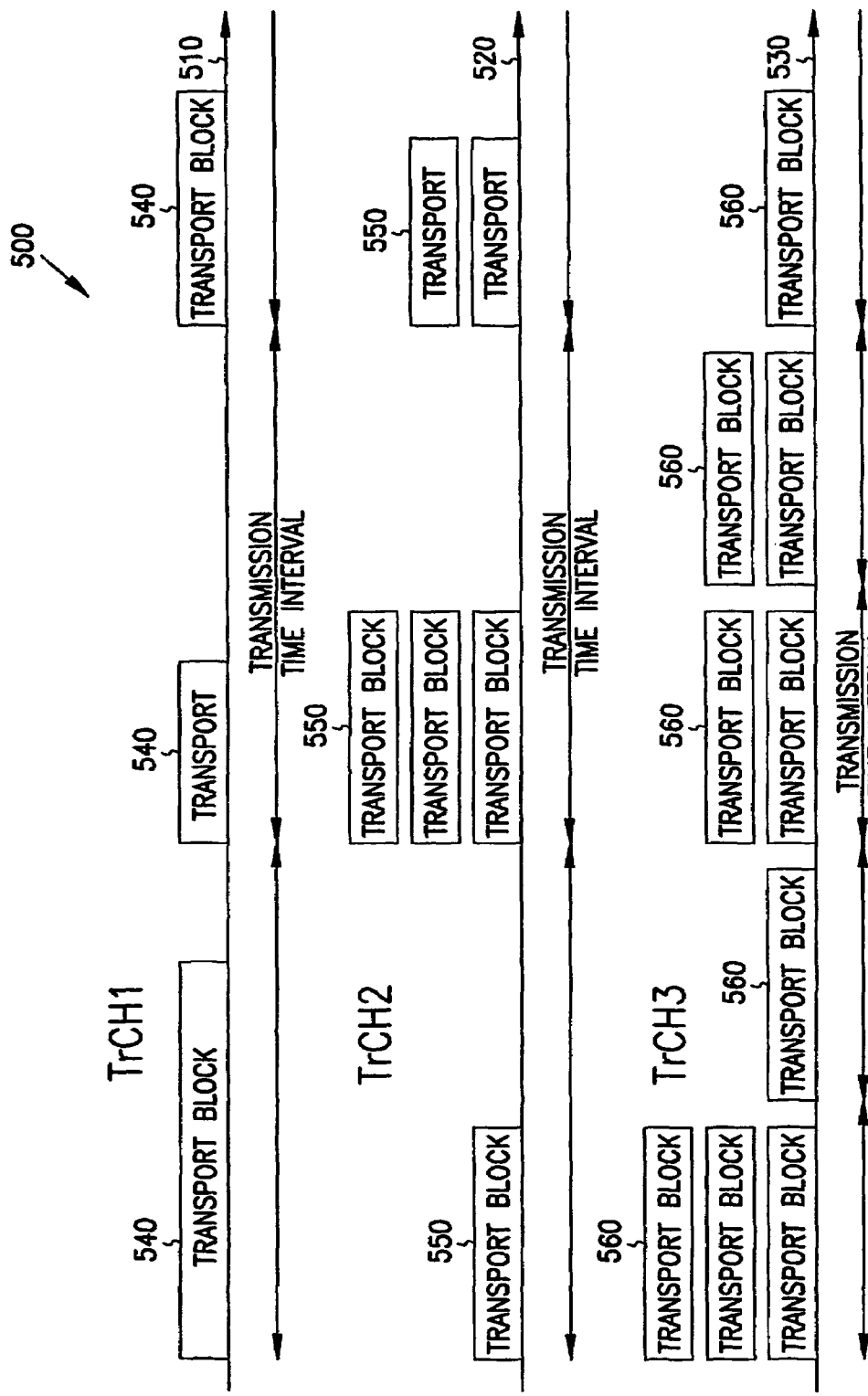
FIG. 5 is a timing diagram illustrating exchanging of data between the MAC and Layer 1 of the prior art 3GPP radio interface protocol architecture shown in FIG. 1.

FIG. 5 illustrates one example embodiment of a timing diagram 500 of data exchanged between the MAC and Layer 1 shown in FIG. 1. Shown in prior art FIG. 5 are first, second, and third transport channels 510, 520, and 530, respectively having three different time lines. As shown in FIG. 5, the first transport channel 510, receives one TB 540 per TH. The second transport channel 520 receives one TB in the first TTI three TBs in the second TTI, and two TBs in the third TTI, and so on. The third transport channel 530 receives three transport blocks during the first TTI, and one TB during the next TTI and so on. It can be seen that each of the three transport channels 510, 520, and 530 is configured according to their own Transport Format Set. It can also be seen that only the Block Sizes within a TTI are varying in each of the transport channels 510, 520, and 530, respectively. Only the TB sizes vary within the possible size constrains included in the TFCI. The MAC 130 not only sends data through the transport channels 510, 520, and 530, respectively, but it also informs how many bits of data are sent through each of the transport channels 510, 520, and 530 based on the TFCI. Physical layer 150 knows ahead of time the Transport Block Size and amount of allowed data coming through each of the transport channels 510, 520, and 530 respectively. For example, if a transport channel has three TFs and the possible TBSs are 10, 20 and 30 bits of data, then every TTI we can expect, either 10, 20, or 30 bits of data. During one TTI, all the possible TB sizes across all channels are indicated by the TFCS. This TFCS information for the last TTI is indicated by the TFCI. This is the information that needs to be transmitted to the receiver side 400. The data coming from all transport channels 140 is multiplexed in the physical layer 150 along with the TFCI and transmitted to the receiver 400. On the receiver side the TFCI helps separate the multiplexed signal 160 demodulated data is properly channeled to the appropriate transport channels 140 on the receiver 400 side. As explained before with reference to FIG. 4, The TFCI and data are transmitted every 10 milliseconds, whereas the TF of each of the transport channels changes only once every TTI. For example, if the TTI for a transport channel is 80 milliseconds then this information can be used to improve decoder 420 reliability and performance, because the decoder 420 can assume that for the next 8 (10 millisecond) intervals the same information is received from the transmitter 200.

Figure 6:
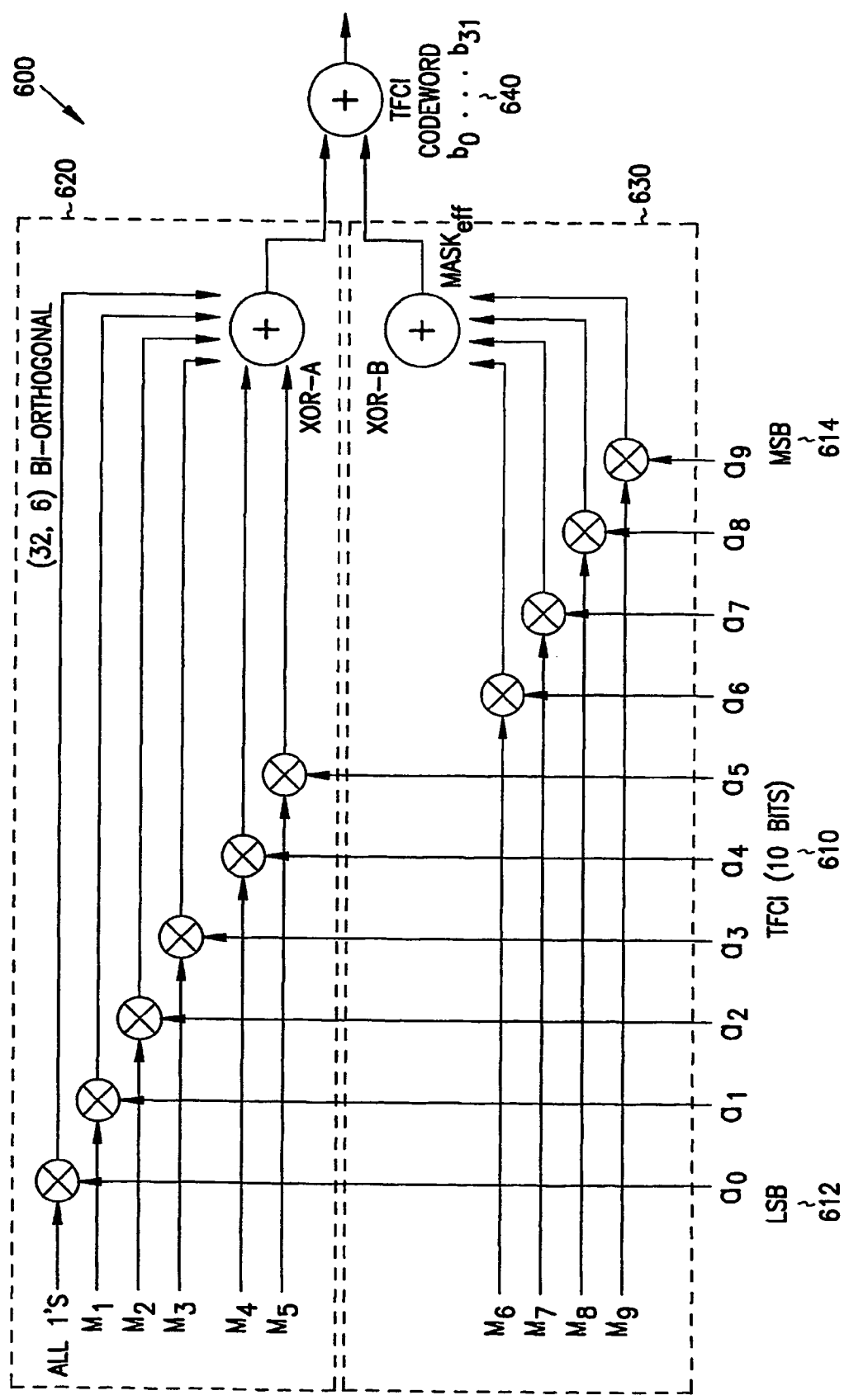
FIG. 6 is a detailed block diagram of a prior art TFCI channel encoder structure.

FIG. 6 is a prior art block diagram 600 of a detailed TFCI channel encoder structure used in 3G systems. The 3G system standards require every mobile to have a TFCI table. As shown in FIG. 6, the TFCI consists of 10 bits $a_0, a_1, a_2, a_3, a_4, a_5, a_6, a_7, a_8, a_9$ 610. Where $a_0$ is LSB 612 and $a_9$ is MSB 614. The maximum number of combinations that can be formed using the 10 bits in the TFCI can be only 1024. The TFCI is a binary representation of the index. For example, to represent 3, in decimal $a_0$ and $a_1$ will be '1' and the rest of the bits $a_2, a_3 \ldots a_9$ will be '0'.

If 10 bits are input 610 to the decoder 420, it will output 32 bits. The TFCI bits are encoded using a (32,10) sub-code of the second order Reed-Muller code. The coding scheme is illustrated in FIG. 6. The Codewords of the (32,10) sub-code of the second order Reed-Muller code are linear combination of 10 basis sequences. The basis sequences are as in the following table:

TABLE 1

Basis sequences for (32, 10) TFCI code

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 0 | 1 | 0 | 0 | 0 | 0 | 1 | 0 | 0 | 0 | 0 |
| 1 | 0 | 1 | 0 | 0 | 0 | 1 | 1 | 0 | 0 | 0 |
| 2 | 1 | 1 | 0 | 0 | 0 | 1 | 0 | 0 | 0 | 1 |
| 3 | 0 | 0 | 1 | 0 | 0 | 1 | 1 | 0 | 1 | 1 |
| 4 | 1 | 0 | 1 | 0 | 0 | 1 | 0 | 0 | 0 | 1 |

TABLE 1-continued

Basis sequences for (32, 10) TFCI code

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ |
|---|---|---|---|---|---|---|---|---|---|---|
| 5  | 0 | 1 | 1 | 0 | 0 | 1 | 0 | 0 | 1 | 0 |
| 6  | 1 | 1 | 1 | 0 | 0 | 1 | 0 | 1 | 0 | 0 |
| 7  | 0 | 0 | 0 | 1 | 0 | 1 | 0 | 1 | 1 | 0 |
| 8  | 1 | 0 | 0 | 1 | 0 | 1 | 1 | 1 | 1 | 0 |
| 9  | 0 | 1 | 0 | 1 | 0 | 1 | 1 | 0 | 1 | 1 |
| 10 | 1 | 1 | 0 | 1 | 0 | 1 | 0 | 0 | 1 | 1 |
| 11 | 0 | 0 | 1 | 1 | 0 | 1 | 0 | 1 | 1 | 0 |
| 12 | 1 | 0 | 1 | 1 | 0 | 1 | 0 | 1 | 0 | 1 |
| 13 | 0 | 1 | 1 | 1 | 0 | 1 | 1 | 0 | 0 | 1 |
| 14 | 1 | 1 | 1 | 1 | 0 | 1 | 1 | 1 | 1 | 1 |
| 15 | 1 | 0 | 0 | 0 | 1 | 1 | 1 | 1 | 0 | 0 |
| 16 | 0 | 1 | 0 | 0 | 1 | 1 | 1 | 1 | 0 | 1 |
| 17 | 1 | 1 | 0 | 0 | 1 | 1 | 1 | 0 | 1 | 0 |
| 18 | 0 | 0 | 1 | 0 | 1 | 1 | 0 | 1 | 1 | 1 |
| 19 | 1 | 0 | 1 | 0 | 1 | 1 | 0 | 1 | 0 | 1 |
| 20 | 0 | 1 | 1 | 0 | 1 | 1 | 0 | 0 | 1 | 1 |
| 21 | 1 | 1 | 1 | 0 | 1 | 1 | 0 | 1 | 1 | 1 |
| 22 | 0 | 0 | 0 | 1 | 1 | 1 | 0 | 1 | 0 | 0 |
| 23 | 1 | 0 | 0 | 1 | 1 | 1 | 1 | 1 | 0 | 1 |
| 24 | 0 | 1 | 0 | 1 | 1 | 1 | 1 | 0 | 1 | 0 |
| 25 | 1 | 1 | 0 | 1 | 1 | 1 | 0 | 0 | 0 | 1 |
| 26 | 0 | 0 | 1 | 1 | 1 | 1 | 0 | 0 | 1 | 0 |
| 27 | 1 | 0 | 1 | 1 | 1 | 1 | 1 | 1 | 0 | 0 |
| 28 | 0 | 1 | 1 | 1 | 1 | 1 | 1 | 1 | 1 | 0 |
| 29 | 1 | 1 | 1 | 1 | 1 | 1 | 1 | 1 | 1 | 1 |
| 30 | 0 | 0 | 0 | 0 | 0 | 1 | 0 | 0 | 0 | 0 |
| 31 | 0 | 0 | 0 | 0 | 1 | 1 | 1 | 0 | 0 | 0 |

The TFCI information bits correspond to the TFC index (expressed in unsigned binary form) used to reference the TFC of the CCTrCH in the associated radio frame.

The output Codeword bits $b_i$ are given by the following equation:

$$b_i = \sum_{n=0}^{9} (a_n \times M_{i,n}) \bmod 2$$

where i=0, 1, ..., 31; and the output bits are denoted by bk, k=0, 1, 2, ..., 31.

The output bits are segmented into each slot such that all 32 bits are sent in one frame. FIG. 6 shows a detailed TFCI encoder structure. It should be noted that the first 6 basis sequences ($M_0$-$M_5$) are (32,6) Bi-orthogonal codes (first order Reed-Muller codes). Hence Fast Hadamard Transform (FHT) can be used to detect $a_0$ to $a_5$. Mask$_{eff}$ is a linear combination of $M_6$-$M_9$ (16 possible combinations depending on the values of $a_6$ to $a_9$) used to mask the output of XOR-A. As illustrated in FIG. 6, $M_1$ is multiplied by $a_1$, $M_2$ is multiplied by $a_2$ and so on to obtain the Reed-Muller code. For example, if $a_1$ is '0' and $M_1$ is a value obtained from the above-illustrated table, then $a_1$ is multiplied by $M_1$, and the final value will be '0', that means the $M_1$ will not contribute to the code.

Figure 7:
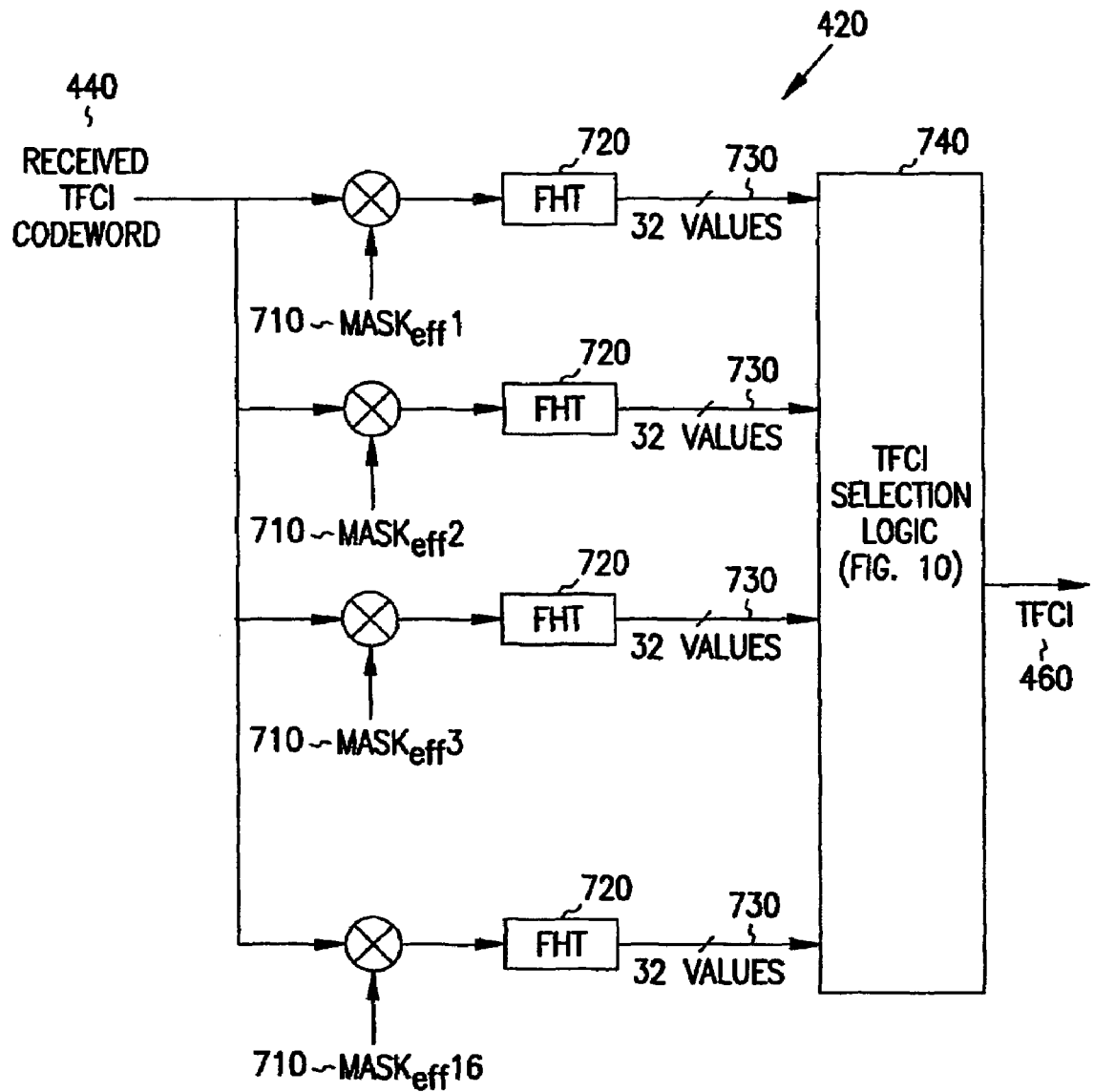
FIG. 7 is a detailed block diagram of a prior art TFCI decoder structure.

FIG. 7 illustrates a block diagram 700 of a prior art TFCI decoder structure used in the current 3G systems. The TFCI decoder is located on the receiver side and reverses the above-described TFCI encoding process. The 32 bit Reed-Muller Code 440 received by the TFCI decoder is first unmasked using all the 16 masks 710. Each of the unmasking is done in parallel and independently. After unmasking the unmasked data is input to the respective FHT blocks 720 to produce 32 values. The TFCI selection logic device 740 receives all of the 32 values from each of the FHT blocks 720 and selects the maximum (ignoring the sign +/−) of all the 32 values. $a_1$ to $a_5$ correspond to the binary representation of the index (0 to 31) of the maximum of the 32 values. The sign of the selected values can be positive or negative. This sign will indicate the value of $a_0$, if the sign of the maximum values is positive then $a_0$ will be '0' and if the sign of the maximum values is negative, then $a_0$ will be '1'. One FHT block gives the values of $a_0$ to $a_5$. Looking at the output of all 16 FHT blocks 730, and choosing the FHT block that has the maximum value gives the values of $a_6$ to $a_9$ correspond to the binary representation of the FHT block number (0 to 15) which gives the maximum value output. This is the process currently used in the TFCI decoding scheme illustrated in FIG. 7.

As already explained with reference to FIG. 6, the TFCI is transmitted every 10 milliseconds (every frame) and similarly decoded once every frame on the receiver 400 side. Hence, every 10 milliseconds, one of the 1024 possible TFCIs is detected by searching for the maximum output across all 16 FHT blocks 720.

In the above-mentioned decoding technique, the decoded TFCI 460 has a very large probable space (1024 possible values) every frame. The decoding is performed assuming that all TFCIs are equally probable. During bad channel conditions, this technique of decoding yields poor results, as we are searching for the maximum output across all 16 FHT blocks 720. In a 3GPP system 100, during uplink, control bits (TFCI and power control) and data bits are transmitted in parallel on separate physical channels. The TFCI is also an indicator for the spreading factor (SF) used on the data channel. Hence fast TFCI decoding is necessary to avoid any delay in decoding data bits and also to avoid buffering of data bits before despreading as disclosed in Patent No. WO09903225. Searching for maximum output over all the 16 FHT blocks is very time consuming and significantly reduces the speed and performance of the system 100 during data-rate detection. It also increases the likelihood of false rate detection (detection of wrong data-rate), and requires significantly more computation.

Figure 8:
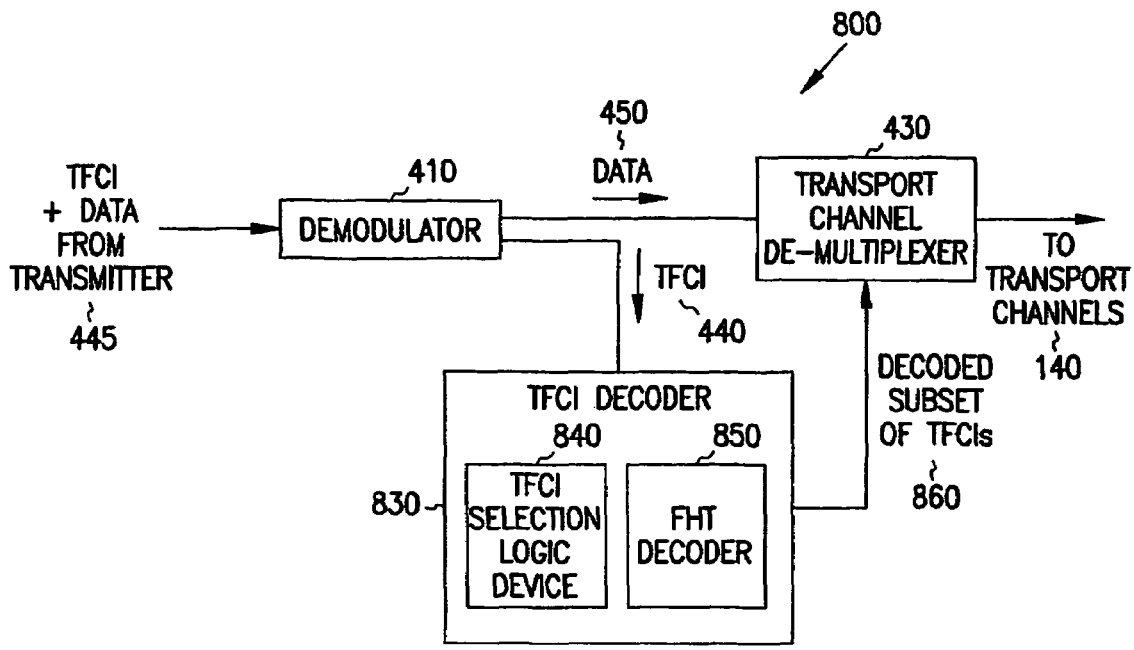
FIG. 8 is a block diagram of the 3GPP physical layer receiver according to the teachings of the present invention.

FIG. 8 is a block diagram of the 3GPP physical layer receiver 800 according to the teachings of the present invention. A demodulator 400 is connected to receive a signal including the TFCI and data 445 associated with each of the transport channels from a transmitter. The received signal is a succession of frames, wherein in each of the succession of frames includes data and the TFCI associated with each of the multiple transport channels. The demodulator 410 separates the TFCI 440 from the received data and TFCI 445.

A TFCI decoder 830 coupled to the demodulator includes a TFCI Selection Logic Device 840 and a FHT decoder 850. The TFCI Selection Logic Device 840 receives the separated TFCI 440 from the demodulator 410 and obtains a maximum number of valid TFCs that can be formed using the transport channels from a given set of TFCS within a frame. The TFCI Selection Logic Device 840 further obtains a maximum number of TFCIs that can be formed using the TFCS within the frame, and them computes a subset of TFCIs using the obtained maximum number of valid TFCIs and the maximum number of TFCIs that can be formed using the TFCS.

For example, TFCS is available both at the receiver 800 as well as the transmitter 200 before data transmission. Not all 1024 TFCIs are valid combinations, as explained in detail with reference to FIGS. 5, 6, and 7. The number of valid combinations is given by the size of the TFCS table as described in detail with reference to Table 1. Using the table a maximum number of valid TFCIs, that is less 1024 TFCIs can be obtained. Instead of searching over all 16 FHT blocks 720, the search can be limited to less than 1024 TFCIs.

The FHT decoder 850 decodes the actual TFCI from the computed subset of TFCIs for the frame, to reduce computation during decoding and to further improve data-rate detection reliability. A de-multiplexer 430 attached to the demodulator 410 and the TFCI decoder 830 receives the separated data 450 from the demodulator 410 and the decoded subset of TFCIs from the FHT decoder 850 and outputs the received 450 data to respective transport channels using the received decoded subset of TFCIs 860.

In some embodiments, TFCIs comprise a TFCI Codeword 440 formed using a sub-code of the second order Reed-Muller code explained in detail with reference to FIG. 6. In some embodiments, the FHT decoder 850 decodes the subset of TFCIs using the Fast Hadamard Transform (FHT). In the embodiment shown in FIG. 8, the receiver 800 receives TFCIs every frame. In some embodiments, each frame has a time interval of 10 milliseconds. In some embodiments, the FHT Selection Logic Device 840 divides the obtained maximum number of valid transport format combinations (valid TFCIs) by the obtained maximum number of TFCIs to obtain the subset of TFCIs.

In some embodiments, the TFCI Selection Logic Device 840 further obtains a TTI associated with each of the computed subset of TFCIs. Then the Device 840 obtains a maximum TTI (TTI_max) and a minimum TTI (TTI_min) associated with each of the computed subset of TFCIs. Then the FHT decoder 850 decodes the subset of TFCIs to obtain transport formats associated with each of the computed subset of TFCIs at the beginning of the frame, and the FHT decoder further decodes the computed subset of TFCIs again after the completion of TTI_min. The Device 840 and FHT decoder 850 again repeats the computation of the TTI_max and TTI_min and decodes the subset of TFCIs at the end of the TTI_max. For example, when the transport format of a transport channel changes only after every TTI/10 frames in a receiver including multiple transport channels, the TFCI remains the same for where 'i' ranges over all transport channels. Therefore, within these frames, the received TFCI encoded bits can be combined to increase the TFCI detection reliability.

In some embodiments, the TFCI includes transport formats specific to each of the transport channels. The TFCI can comprise semi-static and dynamic parts. The semi-static part includes transport properties such as TTI, error protection schemes, type of error protection, coding rate, static rate matching parameter, puncturing limit, and/or size of extra bits. The dynamic part can include transport properties such as transport block size and/or transport block set size. In some embodiments, the TTI includes one or more frames. Each of the one or more frames can have a time interval of 10 milliseconds. In some embodiments, TTI_max includes obtaining a TTI having a maximum number of frames, and TTI_min includes obtaining a TTI having a minimum number of frames.

In some embodiments, TFCI Selection Logic Device 840 further computes possible TFCIs for a next frame from the computed subset of TFCIs, and limits the decoding by the =decoder 850 to the TFCIs in the next frame to computed possible TFCIs. For example, different transport channels have different TTIs, while the transport channels of some of the channels change, the transport channels of the others remain the same. Hence knowing the present TFCI it is possible to know all the possible TFCIs of the next frame, apriori. Then it is enough to limit the search to the next frame to these possible TFCIs only. As explained above, only after every $$\left(\min_{i}(TTI_i)\right)/10$$

do the transport formats of all the transport channels change. Limiting the search to only the possible TFCIs further reduces the computation and increases data-rate detection reliability.

Figure 9:
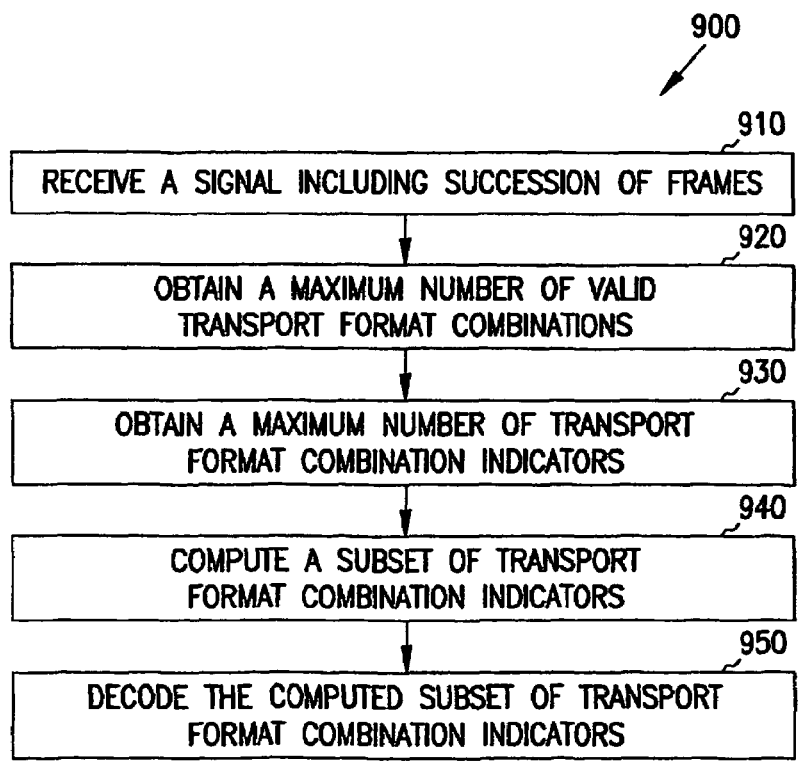
FIG. 9 is a flowchart illustrating an example embodiment of the operation of the receiver shown in FIG. 8.

FIG. 9 illustrates one example embodiment of a process 900 of data-rate detection in a signal received from a transmitter of a cellular radio communication system including multiple transport channels supporting variable data-rate transmissions. The process begins with step 910 by receiving the signal including a succession of frames, wherein each of the succession of frames includes data and the TFCI associated with each of the multiple transport channels. In some embodiments, the TFCI is received every frame and the time interval of each of the frames is about 10 milliseconds.

Step 920 includes obtaining a maximum number of valid transport format combinations that can be formed for each of the multiple transport channels from a given set of TFCS within each frame. In some embodiments, the TFCI includes the TFCI Codewords formed using a sub-code of the second order Reed-Muller code.

Step 930 includes obtaining a maximum number of TFCIs that can be formed using the TFCS within the frame. In some embodiments, the maximum number of TFCI Codewords that can be formed using the TFCIs is 1024. Step 940 includes computing a subset of TFCIs using the obtained maximum number of valid TFCs and the obtained maximum number of TFCIs within the frame. In some embodiments, computing a subset of TFCIs further includes dividing the obtained maximum number of valid transport format combinations by the obtained maximum number of TFCIs to obtain a computed value, then rounding off the obtained computed value to a nearest highest integer to obtain the subset of TFCIs. Step 950 includes decoding the computed subset of TFCIs within the frame to reduce computation during decoding and to improve data-rate detection reliability. In some embodiments, decoding each of the computed subset of TFCI Codewords is performed using FHT.

Figure 10:
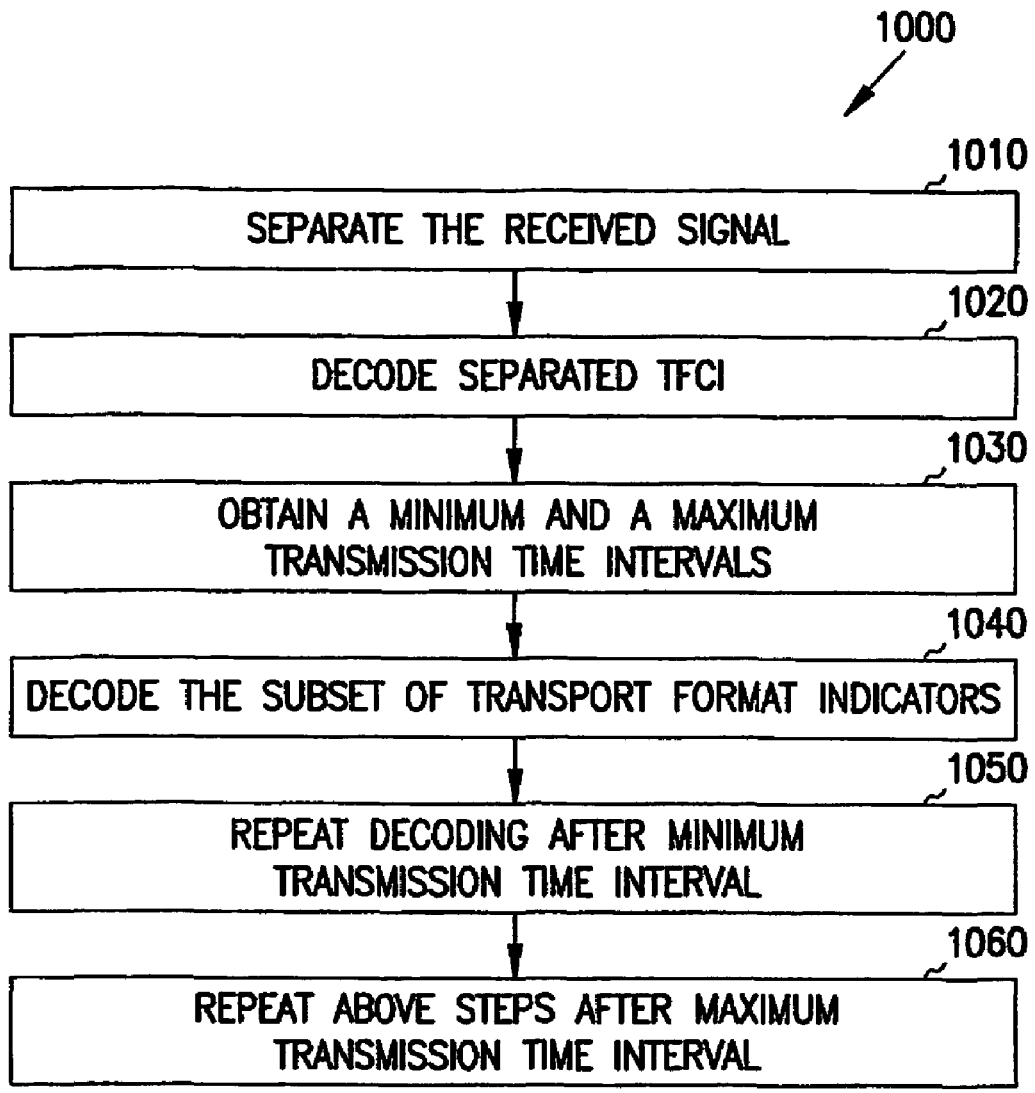
FIG. 10 is a flowchart illustrating another example embodiment of the operation of the receiver shown in FIG. 8.

FIG. 10 illustrates another example embodiment of a process 1000 of data-rate detection in a signal received from a transmitter of a cellular radio communication system including multiple transport channels supporting variable data-rate transmissions. The process begins with step 1010 by separating the received signal to obtain TFCI associated with each of the multiple transport channels to obtain the TFCI associated with each of the multiple transport channels. In some embodiments, the TFCI includes transport formats specific to each of the transport channels. The transport formats comprise semi-static and dynamic parts. The semi-static part includes transport properties such as TTI, error protection scheme, type of error protection, coding rate, static rate matching parameter, puncturing limit, and/or size of extra bits. The dynamic part includes transport properties such as transport block size and/or transport block set size. In some embodiments TTI includes one or more frames and each of the one or more frames has a time interval of about 10 milliseconds.

Step 1020 includes obtaining a TTI associated with each of the computed subset of TFCIs. Step 1030 includes further obtaining a minimum TTI (TTI_min) and a maximum TTI (TTI_max) from the obtained TTI associated with each of the computed subset of TFCIs. In some embodiments, the TTI_max comprises obtaining a TTI having a maximum number of frames equal to the TTI_max. In some embodiments, the TTI_min comprises obtaining a TTI having minimum number of frames equal to TTI_min.

Step 1040 includes decoding the subset of TFCIs to obtain transport formats associated with each of the computed subset of TFCIs. Step 1050 includes repeating the decoding of the subset of TFCIs after TTI_min and step 1060 further includes repeating the above steps at the end of the TTI_max to reduce computation and increase data-rate detection reliability.

In some embodiments, the process 1000 further includes computing a possible TFCIs for a next frame from the computed subset of TFCIs, and limiting the decoding of the TFCIs in the next frame to compute possible TFCIs to further reduce computation and enhance data-rate detection reliability.

The methods 900 and 1000 shown in FIGS. 9 and 10 may be implemented as a demodulator 410, a TFCI decoder 830 including TFCI Selection Logic Device 840, and FHT decoder 850, and a transport channel de-multiplexer 430, as shown in FIG. 8. Various aspects of the present invention are implemented in software, which may be run in the environment shown in FIG. 6 or any other suitable computing environment The present invention is operable in a number of other general purpose or special purpose computing environments. Some computing environments are personal computers, general-purpose computers, server computers, hand held devices, laptop devices, multiprocessors, microprocessors, set top boxes, programmable consumer electronics, network PCs, minicomputers, mainframe computers, distributed computing environments and the like to execute the code, which is stored on a computer readable medium. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

Figure 11:
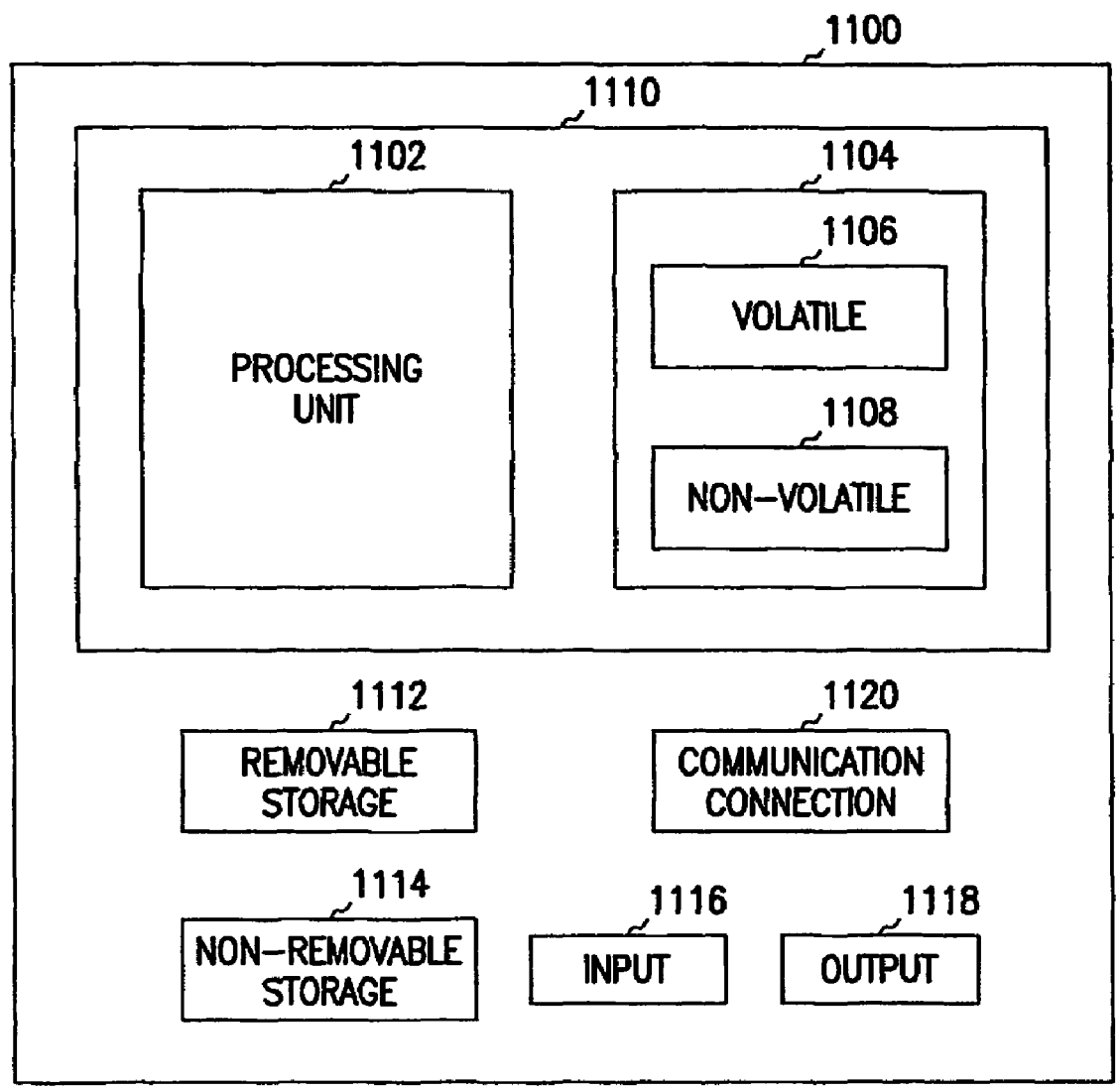
FIG. 11 shows an example of a suitable computing system environment for implementing embodiments of the present invention, such as those shown in FIGS. 8, 9, and 10.

FIG. 11 shows an example of a suitable computing system environment 1100 for implementing embodiments of the present invention, such as those shown in FIGS. 8, 9, and 10. Various aspects of the present invention are implemented in software, which may be run in the environment shown in FIG. 11 or any other suitable computing environment. The present invention is operable in a number of other general purpose or special purpose computing environments. Some computing environments are personal computers, server computers, hand-held devices, laptop devices, multiprocessors, microprocessors, set top boxes, programmable consumer electronics, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

FIG. 11 shows a general computing device in the form of a computer 1110, which may include a processing unit 1102, memory 1104, removable storage 1112, and non-removable storage 1114. The memory 1104 may include volatile 1106 and non-volatile memory 1108. Computer 1110 may include—or have access to a computing environment that includes—a variety of computer-readable media, such as volatile 1106 and non-volatile memory 1108, removable 1112 and non-removable storage 1114. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 1110 may include or have access to a computing environment that includes input 1116, output 1118, and a communication connection 1120. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

CONCLUSION

The above-described invention provides an efficient and reliable data-rate detection in a signal received from a transmitter of a cellular radio communication system including multiple transport channels supporting variable data-rate transmissions in order to properly detect and decode the received signal.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. An improved method for data-rate detection in a signal received from a transmitter of a radio communication system including multiple transport channels supporting variable data-rate transmissions, comprising:

receiving the signal including a succession of frames at a receiver of the radio communication system, wherein the signal in each of the succession of frames includes data and Transport Format Channel Information (TFCI) associated with each of the multiple transport channels, the Transport Format Channel Information comprising a Transport Format Combination Set (TFCS) table and Transport Format Combination Indicators (TFCIs), where the TFCIs index the elements of the TFCS, the TFCIs having a length of K bits, where K is the minimum number of bits required to represent every member of the TFCS uniquely, the TFCIs being padded with N-K zeros to get words of length N, and N-bit padded TFCI words being encoded into TFCI code words using a suitable TFCI encoding logic;

obtaining at the receiver a maximum number of valid transport format combinations that can be formed for the multiple transport channels from a given set of the TFCS table;

obtaining at the receiver the number K as the minimum number of bits required to represent every member of the TFCS distinctly;

obtaining at the receiver a maximum number of TFCIs that can be formed using the TFCS as the number of words where the K bits are potentially non-zero and the remaining N-K bits are set to zero;

computing at the receiver a subset of valid TFCI code words as the TFCI code words corresponding to the TFCI words; and decoding at the receiver the TFCI over the space of only the computed subset of TFCI code words or with higher weight given to the space of the computed subset of valid TFCI code words as compared to other possible TFCI code words to reduce computation during decoding and to improve data-rate detection reliability.

2. The method of claim 1, wherein the TFCI code words are formed using a sub-code of the second order Reed-Muller code.

3. The method of claim 2, wherein the maximum number of TFCI code words that can be formed using the TFCIs is 1024.

4. The method of claim 3, wherein decoding of the computed subset of TFCI code words are performed by using the Fast Hadamard Transform (FHT).

5. The method of claim 1, further comprising:
receiving the TFCI every frame.

6. The method of claim 5, wherein the frame comprises a time interval of about 10 milliseconds.

7. The method of claim 1, wherein computing a subset of TFCI code words further comprises:
dividing the obtained maximum number of valid transport format combinations by the obtained maximum number of TFCIs to obtain a computed value; and
rounding off the obtained computed value to a nearest highest integer to obtain the subset of TFCI code words.

8. The method of claim 1, further comprising:
separating the received signal to obtain Transport Formal Combination Information associated with each of the multiple transport channels to obtain the TFCI associated with each of the multiple transport channels;
obtaining a Transmission Time Interval (TTI) associated with each of the computed subset of TFCI code words;
obtaining a minimum Transmission Time Interval (TTI_min) and a maximum Transmission Time Interval (TTI_max) from the obtained TTI associated with each of the computed subset of TFCI code words;
decoding the subset of TFCI code words to obtain transport formats associated with each of the computed subset of TFCI code words;
repeating the decoding of the subset of TFCI code words after TTI_min; and repeating the above receiving, separating, decoding, obtaining, and decoding steps at the end of TTI_max.

9. The method of claim 8, wherein the TFCI includes transport formats specific to each of the transport channels.

10. The method of claim 9, wherein the transport formats comprise semi-static and dynamic parts.

11. The method of claim 10, where the semi-static part includes transport properties selected from the group consisting of TTI, error protection scheme, type of error protection, coding rate, static rate matching parameter, puncturing limit, and size of extra bits.

12. The method of claim 10, wherein the dynamic part includes transport properties selected from the group consisting of transport block size and transport block set size.

13. The method of claim 8, wherein the TTI includes one or more frames in the receiver.

14. The method of claim 13, wherein each of the one or more frames has a time interval of 10 milliseconds.

15. The method of claim 8, wherein obtaining the TTI_max comprises:
obtaining a TTI having a maximum number of frames as the TTI_max.

16. The method of claim 8, wherein obtaining the TTI_min comprises:
obtaining a TTI having a minimum number of frames as TTI_min.

17. The method of claim 1, further comprising:
computing possible TFCIs for a next frame from the computed subset of TFCI code words; and
limiting the decoding of the TFCI code words in the next frame to decoding the computed possible TFCI code words.

18. A computer readable medium having computer-executable instructions for an improved data-rate detection in a cellular radio communication system including multiple transport channels supporting variable data-rate transmissions, comprising:
receiving a signal including a succession of frames, wherein the signal in each of the succession of frames includes data and Transport Format Channel Information (TFCI) associated with each of the multiple transport channels, the Transport Format Channel Information comprising a Transport Format Combination Set (TFCS) table and Transport Format Combination Indicators (TFCIs), where the TFCIs index the elements of the TFCS, the TFCIs having a length of K bits, where K is the minimum number of bits required to represent every member of the TFCS uniquely, the TFCIs being padded with N-K zeros to get words of length N, and N-bit padded TFCI words being encoded into TFCI code words using a suitable TFCI encoding logic;
obtaining a maximum number of valid transport format combinations that can be formed using the multiple transport channels from a given set of the TFCS table;
obtaining the number K as the minimum number of bits required to represent every member of the TFCS distinctly;
obtaining a maximum number of TFCIs that can be formed using the TFCS as the number of words where the K bits are potentially non-zero and the remaining N-K bits are set to zero;
computing a subset of valid TFCI code words as the TFCI code words corresponding to the TFCI words; and
decoding the TFCI over the space of only the computed subset of valid TFCI code words or with higher weight given to the space of the computed subset of valid TFCI code words as compared to other possible TFCI code words to reduce computation during decoding and to improve TFCI detection reliability.

19. The medium of claim 18, further comprising:
forming the obtained TFCI code words using a sub-code of the second order Reed-Muller code.

20. The medium of claim 19, wherein the maximum number of TFCI code words that can be formed using the TFCIs is 1024.

21. The medium of claim 18, wherein decoding of the computed subset of TFCI code words is performed by using Fast Hadamard Transform (FHT).

22. The medium of claim 18, further comprising:
receiving the TFCI every frame.

23. The medium of claim 22, wherein the frame comprises an approximately 10 millisecond time interval.

24. The medium of claim 18, wherein computing a subset of TFCI code words further comprises:
dividing the obtained maximum number of valid transport format combinations by the obtained maximum number of TFCIs to obtain a computed value; and
rounding off the obtained computed value to a nearest highest integer to obtain the subset of TFCI code words.

25. A computer readable medium having computer-executable instructions for an improved data-rate detection in a communication system including multiple transport channels supporting variable data-rate transmissions, comprising:
receiving TFCI and data associated with each of the multiple transport channels in the cellular radio communication system;
separating the TFCI from data associated with each of the multiple transport channels to obtain the TFCI associated with each of the multiple transport channels, the Transport Format Channel Information comprising a Transport Format Combination Set (TFCS) table and Transport Format Combination Indicators (TFCIs), where the TFCIs index the elements of the TFCS, the TFCIs having a length of K bits, where K is the minimum number of bits required to represent every member of the TFCS uniquely, the TFCIs being padded with N-K zeros to get words of length N, and N-bit padded TFCI words being encoded into TFCI code words using a suitable TFCI encoding logic;
decoding separated TFCI code words to obtain a Transmission Time Interval (TTI) associated with each of the TFCI code words;
obtaining a minimum Transmission Time Interval (TTI_min) and a maximum Transmission Time Interval (TTI_max) from the obtained TTI associated with each of the TFCIs;
decoding a subset of TFCI code words to obtain transport formats associated with each of the TFCI code words;
repeating the decoding of the TFCIs after TTI_min; and
repeating the above receiving, separating, decoding, obtaining, and decoding steps at the end of TTI_max.

26. The medium of claim 25, wherein the TFCI includes transport formats specific to each of the transport channels.

27. The medium of claim 26, wherein the transport formats comprise semi-static and dynamic parts.

28. The medium of claim 27, where the semi-static part includes transport properties selected from the group consisting of TTI, error protection scheme, type of error protection, coding rate, static rate matching parameter, puncturing limit, and size of extra bits.

29. The medium of claim 27, wherein the dynamic part includes transport properties selected from the group consisting of transport block size and transport block set size.

30. The medium of claim 25, wherein the TTI includes one or more frames.

31. The medium of claim 30, wherein each of the one or more frames has a time interval of 10 milliseconds.

32. The medium of claim 25, wherein obtaining the TTI_max comprises:
obtaining a TTI having a maximum number of frames as the TTI_max.

33. The medium of claim 25, wherein obtaining the TTI_min comprises:
obtaining a TTI having minimum number of frames as TTI_min.

34. A computer system for detecting data-rate detection signal received from a transmitter capable of transmitting data at a plurality of data rates, comprising:
a storage device;
an output device; and
a processor programmed to repeatedly perform a method, comprising:
receiving the signal including a succession of frames, wherein each of the succession of frames includes data and Transport Format Channel Information (TFCI) associated with each of the multiple transport channels, the Transport Format Channel Information comprising a Transport Format Combination Set (TFCS) table and Transport Format Combination Indicators (TFCIs), where the TFCIs index the elements of the TFCS, the TFCIs having a length of K bits, where K is the minimum number of bits required to represent every member of the TFCS uniquely, the TFCIs being padded with N-K zeros to get words of length N, and N-bit padded TFCI words being encoded into TFCI code words using a suitable TFCI encoding logic;
obtaining a maximum number of valid transport format combinations that can be formed for the multiple transport channels from a given set of the TFCS table;
obtaining the number K as the minimum number of bits required to represent every member of the of the TFCS distinctly;
obtaining a maximum number of TFCIs that can be formed using the TFCS as the number of words where the K bits are potentially non-zero and the remaining N-K bits are set to zero;
computing a subset of valid TFCI code words using the obtained maximum number of valid transport format combinations and the obtained maximum number of TFCIs; and
decoding the TFCI over the space of only the computed subset of valid TFCI code words or with higher weight given to the space of the computed subset of valid TFCI code words as compared to other possible TFCI code words to reduce computation during decoding and to improve data-rate detection reliability.

35. The system of claim 34, wherein the TFCI code words are formed using a sub-code of the second order Reed-Muller code.

36. The system of claim 35, wherein the maximum number of TFCI code words that can be formed using the TFCIs is 1024.

37. The system of claim 36, wherein decoding of the computed subset of TFCI code words is performed by using the Fast Hadamard Transform (FHT).

38. The system of claim 34, further comprising:
receiving the TFCI every frame.

39. The system of claim 38, wherein the frame comprises a time interval of about 10 milliseconds.

40. The system of claim 34, wherein computing a subset of TFCI code words further comprises:
  dividing the obtained maximum number of valid transport format combinations by the obtained maximum number of TFCIs to obtain a computed value; and
  rounding off the obtained computed value to a nearest highest integer to obtain the subset of TFCI code words.

41. The system of claim 34, further comprising:
  separating the received signal to obtain Transport Formal Combination Information associated with each of the multiple transport channels to obtain the TFCI associated with each of the multiple transport channels;
  obtaining a Transmission Time Interval (TTI) associated with each of the computed subset of TFCI code words;
  obtaining a minimum Transmission Time Interval (TTI_min) and a maximum Transmission Time Interval (TTI_max) from the obtained TTI associated with each of the computed subset of TFCI code words;
  decoding the subset of TFCI code words to obtain transport formats associated with each of the computed subset of TFCI code words;
  repeating the decoding of the subset of TFCIs after TTI_min; and
  repeating the above receiving, separating, decoding, obtaining, and decoding steps at the end of TTI_max.

42. The system of claim 41, wherein the TFCI includes transport formats specific to each of the transport channels.

43. The system of claim 42, wherein the transport formats comprise semi-static and dynamic parts.

44. The system of claim 43, where the semi-static part includes transport properties selected from the group consisting of TTI, error protection scheme, type of error protection, coding rate, static rate matching parameter, puncturing limit, and size of extra bits.

45. The system of claim 43, wherein the dynamic part includes transport properties selected from the group consisting of transport block size and transport block set size.

46. The system of claim 43, wherein the TTI includes one or more frames.

47. The system of claim 46, wherein each of the one or more frames has a time interval of 10 milliseconds.

48. The system of claim 41, wherein obtaining the TTI_max comprises:
  obtaining a TTI having a maximum number of frames as the TTI_max.

49. The system of claim 41, wherein obtaining the TTI_min comprises:
  obtaining a TTI having minimum number of frames as TTI_min.

50. The system of claim 34, further comprising:
  computing possible TFCI code words for a next frame from the computed subset of TFCI code words; and
  limiting the decoding of the TFCI code words in the next frame to decoding the computed possible TFCI code words.

51. A receiver for data-rate detection in a cellular radio communication system including multiple transport channels supporting variable data-rate transmissions, comprising:
  a demodulator to receive TFCI and data associated with each of the transport channels from a transmitter and to further separate the received TFCI from the data;
  a TFCI decoder to receive the separated TFCI, comprising:
    a TFCI Selection Logic Device to obtain a maximum number of valid TFCs that can be formed using the transport channels from a given set of TFCS within a frame, wherein the device further obtains a maximum number of TFCIs that can be formed using the TFCS within the frame, and the device further computes a subset of TFCI code words using the obtained maximum number of valid TFCIs and the maximum number of TFCI code words that can be formed using the TFCS; and
    a FHT decoder to decode the TFCI over the space of only the computed subset of TFCI code words within the frame or with higher weight given to the space of the computed subset of valid TFCI code words as compared to other possible TFCI code words to reduce computation during decoding and to further improve data-rate detection reliability; and
  a transport channel multiplexer to receive the separated data and output the data to respective transport channels using the decoded subset of TFCI code words.

52. The receiver of claim 51, wherein the TFCI code words are formed using a sub-code of the second order Reed-Muller code.

53. The receiver of claim 52, wherein the FHT decoder decodes the subset of TFCI code words using the Fast Hadamard Transform (FHT).

54. The receiver of claim 51, wherein the receiver receives TFCI every frame.

55. The receiver of claim 54, wherein the frame comprises a time interval of about 10 milliseconds.

56. The receiver of claim 51, wherein the device divides the obtained maximum number of valid transport format combinations (valid TFCIs) by the obtained maximum number of TFCIs to obtain the subset of TFCI code words.

57. The receiver of claim 51, wherein the TFCI Selection Logic Device obtains a Transmission Time Interval associated with each of the computed subset of TFCI code words, and obtains a maximum Transmission Time Interval (TTI_max) and a minimum Transmission Time Interval (TTI_min) associated with each of the computed subset of TFCI code words, wherein the FHT decoder decodes the subset of TFCI code words to obtain transport formats associated with each of the computed subset of TFCI code words at the beginning of the frame, and the FHT decoder further decodes the subset of TFCI code words again after the completion of minimum Transmission Time Interval, and wherein the FHT decoder and the TFCI selection Logic Device repeats the computation of the maximum and minimum Transmission Time Intervals and decoding of the subset of TFCI code words at the end of the maximum Transmission Time Interval.

58. The receiver of claim 57, wherein the TFCI includes transport formats specific to each of the transport channels.

59. The receiver of claim 58, wherein the transport formats comprises semi static and dynamic parts.

60. The receiver of claim 59, wherein the semi-static part includes transport properties selected from the group consisting of TTI, error protection scheme, type of error protection, coding rate, static rate matching parameter, puncturing limit, and size of extra bits.

61. The receiver of claim 60, wherein the dynamic part includes transport properties selected from the group consisting of transport block size and transport block set size.

62. The receiver of claim 57, wherein the TTI includes one or more frames.

63. The receiver of claim 62, wherein the each of the one or more frames has a time interval of 10 milliseconds.

64. The receiver of claim 57, wherein obtaining the TTI_max comprises:
  obtaining a TTI having a maximum number of frames as the TTI_max.

65. The receiver of claim 57, wherein obtaining the TTI_min comprises:

obtaining a TTI having a minimum number of frames as the TTI_min.

66. The receiver of claim 51, wherein the TFCI selection Logic Device computes possible TFCI code words for a next frame from the computed subset of TFCI code words, and limits the decoding by the FHT decoder to the TFCI code words in the next frame to computed possible TFCI code words.

* * * * *

UNITED STATES PATENT AND TRADEMARK OFFICE
CERTIFICATE OF CORRECTION

PATENT NO.         : 7,599,291 B2
APPLICATION NO. : 10/486119
DATED                 : October 6, 2009
INVENTOR(S)       : Kiran T It is certified that error appears in the above-identified patent and that said Letters Patent is hereby corrected as shown below:

In column 18, line 39, in Claim 34, before "TFCS" delete "of the".

In column 20, line 49, in Claim 59, delete "semi static" and insert -- semi-static --, therefor.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO.         : 7,599,291 B2                                    Page 1 of 1
APPLICATION NO. : 10/486119
DATED              : October 6, 2009
INVENTOR(S)        : Kiran T It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1090 days.

Signed and Sealed this

Twenty-eighth Day of September, 2010

David J. Kappos
*Director of the United States Patent and Trademark Office*